United States Patent [19]

Inoue et al.

[11] Patent Number: 5,292,905

[45] Date of Patent: Mar. 8, 1994

[54] CYAN DYES

[75] Inventors: Toshihisa Inoue; Tetsuya Abe; Yoshio Fujiwara, all of Kanagawa, Japan

[73] Assignee: Sony Corporation, Tokyo, Japan

[21] Appl. No.: 851,999

[22] Filed: Mar. 13, 1992

[30] Foreign Application Priority Data

Mar. 13, 1991 [JP] Japan .................. 3-048424

[51] Int. Cl.$^5$ .................. C09B 53/00; C09B 53/02; B41M 5/26
[52] U.S. Cl. ...................... 552/302; 503/227
[58] Field of Search .................. 552/302; 503/227

[56] References Cited

U.S. PATENT DOCUMENTS

| | | | |
|---|---|---|---|
| 3,977,825 | 8/1976 | Kalopissis et al. | 552/302 X |
| 4,829,047 | 5/1989 | Niwa et al. | 503/227 |
| 4,987,120 | 1/1991 | Mikoshiba et al. | 503/227 |
| 5,034,371 | 7/1991 | Tanaka | 503/227 |

FOREIGN PATENT DOCUMENTS

| | | | |
|---|---|---|---|
| 3524519 | 1/1986 | Fed. Rep. of Germany | 503/227 |
| 60-239289 | 11/1985 | Japan | 552/302 |
| 61-91262 | 5/1986 | Japan | 552/302 |
| 3-197183 | 8/1991 | Japan | 552/302 |

OTHER PUBLICATIONS

Patent Abstract of Japan Apr. 24, 1991 Fuji Photo.

*Primary Examiner*—Floyd D. Higel
*Attorney, Agent, or Firm*—Hill, Steadman & Simpson

[57] ABSTRACT

A cyan dye of the formula:

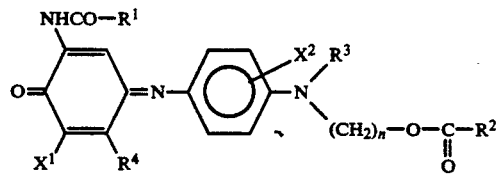

wherein $X^1$ represents halogen; $X^2$ represents hydrogen, alkyl, alkoxy, halogen, alkylcarbonylamino or perfluoroalkyl; $R^1$ and $R^2$ independently represent alkyl, phenyl, perfluoroalkyl, halogen-substituted alkyl, or halogen-substituted phenyl or alkyl-substituted phenyl; $R_3$ represents alkyl; $R^4$ represents alkyl, alkoxy or perfluoroalkyl; and n is an integer of 1 or more. A thermal transfer sheet comprising a substrate and an ink layer, the ink layer comprising a cyan dye of the formula described above, is also disclosed.

2 Claims, No Drawings

CYAN DYES

BACKGROUND OF THE INVENTION

1. Field of the Invention

This invention relates to the art of thermal transfer printing and more particularly, to a dye for cyan color which is contained in an ink layer of a thermal transfer sheet for use as a recording material in a thermal transfer printing system.

2. Description of the Prior Art

A thermal transfer system is known as a technique wherein a thermal energy such as from a thermal head is applied to a thermal transfer sheet having an ink layer to transfer a dye contained at least in the ink layer onto a recording sheet. Since this type of thermal transfer system is adapted for image recording, for example, according to electric signals, attempts have been made to further develop the system thereby recording color images by conversion of electric signals such as of electronic still cameras.

The recording materials which have been proposed to be used in the thermal transfer system include a sublimation-type thermal transfer sheet which has a support and an ink layer formed on the support and made of a sublimable dye and a binder resin. In this type of thermal transfer sheet, recording is effected such that the dye at portions which are heated such as by a thermal head is sublimated and transferred onto a sheet to be transferred. With the sublimation-type transfer sheet, the dye alone is transferred to the sheet to be transferred, so that it is relatively easy to make gradation recording by control of an energy inputted to a thermal head. Thus, attention has been drawn to the transfer sheet suitable for color image recording or printing.

The color image recording using the sublimation-type transfer sheet usually makes use of a thermal transfer sheet which has an ink layer containing magenta, yellow, cyan and black sublimable dyes. These sublimable dyes are thermally transferred one by one onto a material to be transferred. Accordingly, in order to attain good color image recording, the sublimation-type transfer sheet should meet requirements that the dye used has good characteristics. More particularly, the dye is readily sublimated by a thermal energy from a thermal head without involving thermal decomposition, and has a great molecule absorptivity coefficient. In addition, the dye should have a favorable hue from the standpoint of color reproduction and when printed as a cyan dye, it has preferably an absorption maximum wavelength, λmax of 630 to 670 nm. Moreover, the dye should have good light fastness, dark fade resistance, migration resistance, chemical resistance and weatherability and should be easy to prepare without involving any safety and hygienic problems. Extensive developments of dyes which meet the above requirements have been proposed. For instance, indoaniline compounds which have various substituents introduced therein have been proposed as the cyan dye, for example, in Japanese Laid-open Patent Application No. 60-239289 and U.S. Pat. Nos. 4,829,047, 4,695,287 and 4,816,435.

However, these cyan dyes are not satisfactory with respect to the light fastness and the stability in a sheet to be transferred. This leads to the disadvantage that when a transfer sheet which has an ink layer containing such dyes is used to form an image, the image undergoes color change and fading, or color migration during storage.

SUMMARY OF THE INVENTION

It is accordingly an object of the invention to provide a cyan dye which ensures a high density and a good hue when subjected to thermal transfer printing and is able to stably exist in a sheet to be transferred.

It is another object of the invention to provide a cyan dye which is readily sublimable by application of heat used in ordinary thermal transfer printing and which has good light fastness, dark fade resistance and color migration resistance thereby ensuring formation of a cyan image with good gradation properties and a high color density.

According to the invention, there is provided a cyan dye of the following general formula:

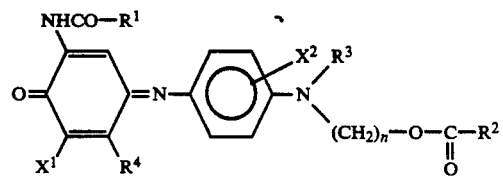

wherein:

$X^1$ represents a halogen atom (chlorine, fluorine, bromine or iodine atom);

$X^2$ is a hydrogen atom, an alkyl group having from 1 to 4 carbon atoms (methyl, ethyl, propyl or butyl), an alkoxy group having from 1 to 4 carbon atoms (methoxy, ethoxy, propoxy or butoxy), a halogen atom (chlorine, fluorine or bromine), or NHCOR wherein R represents an alkyl group having from 1 to 6 carbon atoms (methyl, ethyl, propyl, butyl, amyl or hexyl) or a perfluoroalkyl group having from 1 to 4 carbon atoms (perfluoromethyl, perfluoroethyl, perfluoropropyl or perfluorobutyl);

$R^1$ and $R^2$ independently represent an alkyl group having from 1 to 12 carbon atoms (methyl, ethyl, propyl, butyl, amyl, hexyl, heptyl, octyl, nonyl, decyl, undecyl or dodecyl), a phenyl group, a perfluoroalkyl group having from 1 to 4 carbon atoms (perfluoromethyl, perfluoroethyl, perfluoropropyl or perfluorobutyl), a halogen (chlorine or fluorine)-substituted alkyl group having from 1 to 6 carbon atoms (chloromethyl, chloroethyl, chloropropyl, chlorobutyl, chloroamyl, chlorohexyl, fluoromethyl, fluoroethyl, fluoropropyl, fluorobutyl, fluoroamyl or fluorohexyl) or

wherein X represents a halogen atom (chlorine, fluorine or bromine), an alkyl group having from 1 to 4 carbon atoms (methyl, ethyl, propyl or butyl), or trifluoromethyl;

$R^3$ represents an alkyl group having from 1 to 12 carbon atoms (methyl, ethyl, propyl, butyl, amyl, hexyl, heptyl, octyl, nonyl, decyl, undecyl or dodecyl);

$R^4$ represents an alkyl group having from 1 to 4 carbon atoms (methyl, ethyl, propyl, butyl), an alkoxy group having from 1 to 4 carbon atoms (methoxy, ethoxy, propoxy or butoxy) or a perfluoroalkyl group having from 1 to 4 carbon atoms (perfluoromethyl, perfluoroethyl, perfluoropropyl or perfluorobutyl); and n is an integer of 1 or over.

DETAILED DESCRIPTION OF THE INVENTION

The cyan dye of the present invention has the following general formula

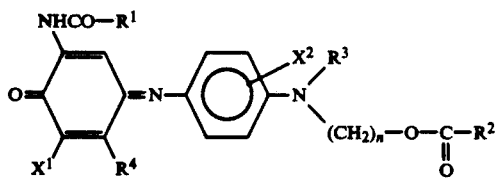

wherein:

$X^1$ represents a halogen atom (chlorine, fluorine, bromine or iodine atom);

$X^2$ is a hydrogen atom, an alkyl group having from 1 to 4 carbon atoms (methyl, ethyl, propyl or butyl), an alkoxy group having from 1 to 4 carbon atoms (methoxy, ethoxy, propoxy or butoxy), a halogen atom (chlorine, fluorine or bromine), or NHCOR wherein R represents an alkyl group having from 1 to 6 carbon atoms (methyl, ethyl, propyl, butyl, amyl or hexyl) or a perfluoroalkyl group having from 1 to 4 carbon atoms (perfluoromethyl, perfluoroethyl, perfluoropropyl or perfluorobutyl);

$R^1$ and $R^2$ independently represent an alkyl group having from 1 to 12 carbon atoms (methyl, ethyl, propyl, butyl, amyl, hexyl, heptyl, octyl, nonyl, decyl, undecyl or dodecyl), a phenyl group, a perfluoroalkyl group having from 1 to 4 carbon atoms (perfluoromethyl, perfluoroethyl, perfluoropropyl or perfluorobutyl), a halogen (chlorine or fluorine) substituted alkyl group having from 1 to 6 carbon atoms (chloromethyl, chloroethyl, chloropropyl, chlorobutyl, chloroamyl, chlorohexyl, fluoromethyl, fluoroethyl, fluoropropyl, fluorobutyl, fluoroamyl or fluorohexyl) or

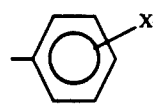

wherein X represents a halogen atom (chlorine, fluorine or bromine), an alkyl group having from 1 to 4 carbon atoms (methyl, ethyl, propyl or butyl), or trifluoromethyl;

$R^3$ represents an alkyl group having from 1 to 12 carbon atoms (methyl, ethyl, propyl, butyl, amyl, hexyl, heptyl, octyl, nonyl, decyl, undecyl or dodecyl);

$R^4$ represents an alkyl group having from 1 to 4 carbon atoms (methyl, ethyl, propyl, butyl), an alkoxy group having from 1 to 4 carbon atoms (methoxy, ethoxy, propoxy or butoxy) or a perfluoroalkyl group having from 1 to 4 carbon atoms (perfluoromethyl, perfluoroethyl, perfluoropropyl or perfluorobutyl); and n is an integer of 1 or over.

The cyan dye is an indoaniline compound which has a halogen atom and an ester bond at predetermined positions, by which the light fastness, dark fade resistance and migration resistance are improved. In addition, such compounds have an absorption maximum wavelength, λmax, of approximately 650 nm and have an optimum hue for use as a cyan color.

The present invention is more particularly described based on experimental results in examples of cyan dyes with reference to Tables 1 to 3.

In the examples, indoaniline derivative dyes are used for thermal transfer recording to determine recording characteristics.

Initially, a number of indoaniline derivatives were prepared and used to fabricate sublimation-type transfer sheets (Examples 1 to 9) having ink layers.

(1) Preparation of Cyan Dyes

For the preparation of indoaniline derivatives, 3 g of 2-(n-butyroylamino-4, 6-dichloro-5-methylphenol is dissolved in 200 g of ethanol, to which a solution of 8 g of sodium carbonate in 100 g of water is added, followed by sufficient agitation. Thereafter, a solution of 5 g of 4-amino-N-(β-hydroxyethyl)-N-ethyl-m-toluidine sulfate in 100 g of water is added to the mixture and agitated for 30 minutes, followed by addition of 15 g of a sodium hypochlorite solution portion by portion. After completion of the addition, the mixture is agitated for 10 minutes, to which 200 g of water is added, followed by filtration to obtain crystals of a dye. The reaction sequence is shown below.

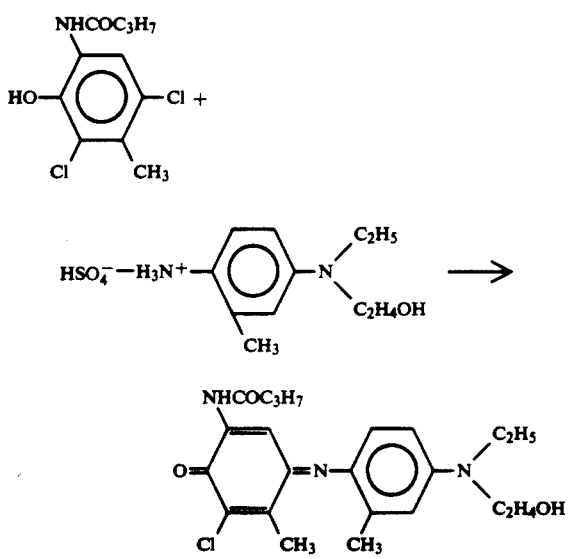

2 g of the dye crystals is dissolved in 50 g of pyridine, to which 0.6 g of butyryl chloride is added portion by portion, followed by esterification while refluxing for 1 hour. The reaction formula is shown below.

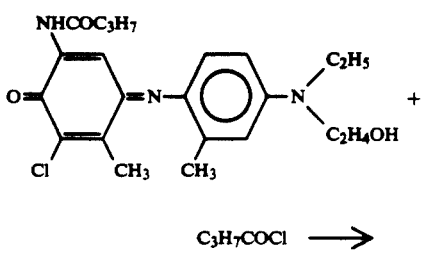

TABLE 1
Dyes Of Invention and Dyes For Comparison
Structural Formula
| | | |
|---|---|---|
| Example 1 | Dye 1 | (structure) |
| Example 2 | Dye 2 | (structure) |
| Example 3 | Dye 3 | (structure) |
| Example 4 | Dye 4 | (structure) |
| Example 5 | Dye 5 | (structure) |
| Example 6 | Dye 6 | (structure) |
| Example 7 | Dye 7 | (structure) |
-continued
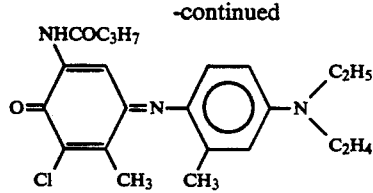
TABLE 2
Dyes Of Invention and Dyes For Comparison
Structural Formula
| | | |
|---|---|---|
| Example 8 | Dye 8 | (structure) |

TABLE 2-continued

Dyes Of Invention and Dyes For Comparison

| | | Structural Formula |
|---|---|---|
| Example 9 | Dye 9 | NHCOCF$_3$ substituted quinoneimine with Cl, CH$_3$, CH$_3$ and N(C$_2$H$_5$)(C$_2$H$_4$—O—C(=O)—C$_3$H$_7$) |
| Comp. Ex. 1 | — | NHCOC$_3$H$_7$ substituted quinoneimine with Cl, CH$_3$, CH$_3$ and N(C$_2$H$_5$)(C$_2$H$_5$) |
| Comp. Ex. 2 | — | NHCO—C$_6$H$_5$ substituted quinoneimine with Cl, CH$_3$, CH$_3$ and N(C$_2$H$_5$)(C$_2$H$_5$) |
| Comp. Ex. 3 | — | NHCOCH$_3$ substituted quinoneimine with N(C$_2$H$_5$)(C$_2$H$_4$—O—C(=O)—CH$_3$) |
| Comp. Ex. 4 | — | NHCOCH$_3$ substituted quinoneimine with CH$_3$ and N(C$_2$H$_5$)(C$_2$H$_4$—O—C(=O)—CH$_3$) |

The resultant compound is subjected to column chromatography using chloroform as a developing solvent (filler: Wake Gel C-200 available from Wake Junyaku Co., Ltd.) and purified to obtain dye 1.

Likewise, tolidine derivatives and aminophenol derivatives having substituents corresponding to intended structures are reacted and the resultant products are further reacted with butyryl chloride, acetic anhydride or a benzoyl chloride derivative to obtain dyes 2 to 9 under similar reaction conditions. The structural formulas of the respective dyes are indicated in Tables 1 and 2.

For comparison, four dyes which are free of a halogen atom or any ester bond are prepared.

(2) Fabrication of Sample Sheet

Ink layer compositions containing these dyes were prepared according to the following formulation.

| Ink layer composition: | |
|---|---|
| Dye | 3.70 parts by weight |
| Ethylhydroxyethyl cellulose (Hercules) | 7.42 parts by weight |
| Toluene | 44.44 parts by weight |
| Methyl ethyl ketone | 44.44 parts by weight |

Each mixture with the above formulation was agitated to obtain an ink layer composition. This ink layer composition was applied, by means of a coiled bar, onto a 6 μm thick, back-treated polyethylene terephthalate (PET) film in a dry thickness of about 1 μm to obtain a sublimation-type transfer sheet as a sample sheet.

The respective sample sheets thus obtained were used to thermal transfer printing on an image-receiving layer sheet on which an image was to be transferred.

(3) Fabrication of an image-receiving layer sheet

The sheet was fabricated by applying, onto a 150 μm thick synthetic paper (FPG-150 of Oji-Yuka Co., Ltd.), an image-receiving layer composition in a dry thickness of 10 μm and curing at 50° C. for 48 hours. The image-receiving layer composition has the following formulation.

| Image-receiving layer composition: | |
|---|---|
| Polyester resin (Erither UE3600 of Unichika Co., Ltd.) | 100.0 parts by weight |
| Isocyanate (Takenate D-110N of Takeda Pharm. Co., Ltd.) | 5.0 parts by weight |
| Modified silicone oil (SF8247 of Toray/Dow Corning Co., Ltd.) | 1.0 parts by weight |
| Methyl ethyl ketone | 60.0 parts by weight |
| Toluene | 240.0 parts by weight |

(4) Thermal Transfer Printing

This is carried out in steer steps of twelve gradiations by using a color video printer (CVP-G500 of Sony Corp.).

(5) Measurements of Characteristic Properties

The sample sheets using the dyes 1 to 9 and the dyes for comparison were subjected to measurements of a color density, hue and stability, in the sheet to be transferred, of a recorded image from each sheet. The results are shown in Table 3.

In Table 3, the light fastness was determined as follows: each image surface was irradiated with a Xenon arc fade meter (Suga Testing Machine Co., Ltd.) under conditions of 40° C., a relative humidity of 65% and 30,000 KJ and determined as a residual rate of the dye at an image portion with a color density of about 1.0. The dark fade resistance was measured by aging for ten days under conditions of 60° C. and a relative humidity of 85% and determined as a residual rate of the dye. The migration resistance was evaluated according to a procedure wherein an image portion exhibiting a maximum color density was superposed with a synthetic paper (FPG-60 of Oji-Yuka Co., Ltd.), applied with a load of 40 g/cm$^2$ and aged at 60° C. for 48 hours, followed by measurement of the color density of the dye migrated on the synthetic paper by means of the Macbeth densitometer (TR-924 of Status A Filter Co., Ltd.). The maximum print density (max density) indicates a maximum color density determined with the Macbeth densitometer. The absorption maximum wavelength ($\lambda$max) means a wavelength at which a printed sheet exhibits an absorption maximum when determined by means of a spectrometer (MCPD-1000 of Otsuka Electronics Co., Ltd.).

When Examples 1 to 9 and Comparative Examples 1 to 4 are compared with one another with respect to the light fastness of Table 3, the light fastness of Examples 1 to 9 is in the range of from 87 to 92 which is, more or less, higher than 86 to 90% of Comparative Examples 1 and 2 and is significantly higher than 67 to 69% of Comparative Examples 3 and 4. With respect to the dark fade resistance, while Comparative Examples of 1 to 4 are scattered in a range of from 78 to 98%, the values of Examples 1 to 9 are almost 100%, giving evidence that little fading takes place. With regard to the migration resistance, while the values of Comparative Examples are in a range of from 0.08 to 0.25, the values of Examples 1 to 9 are in a range of from 0.01 to 0.04 which are smaller substantially by one order of magnitude, thus being very high. The maximum density of the recorded image is as high as 2.3 to 3.2, revealing that the dyes have sensitivity enough to be in practical use. On the other hand, the absorption maximum wavelength, $\lambda$max, is, in most cases, in the vicinity of 650 nm, revealing that the dyes have a good cyan color. The reason why good results are obtained in Examples 1 to 9 is considered due to the fact that the dyes 1 to 9 of the examples have both a halogen atom and an ester bond in the molecular structure.

As will be apparent from the above, the cyan dyes of the invention are indoaniline compounds which have a halogen atom and an ester bond and which are able to be readily sublimated at a heat energy ordinarily applied by thermal transfer printing. The dye assumes a good cyan color at a high density and exhibits good light fastness, dark fade resistance and migration resistance. After thermal transfer, the dye can stably exist in a sheet to be transferred.

The use of the sublimation-type transfer sheet using the cyan dye as an ink layer in the thermal transfer printing ensures formation of a cyan-colored image which has excellent gradation properties and a high color density. In addition, when the cyan dye is used in combination with appropriate magenta and yellow dyes, good-quality full color image recording is possible. Since the cyan dye has good light fastness, dark fade resistance and migration resistance, the resultant images can be kept unchanged over a long term without involving color change and fading, or color migration.

TABLE 3

CHARACTERISTIC PROPERTIES OF SAMPLE SHEETS OF INVENTION AND FOR COMPARISON

| | Light Fastness (%) | Dark Fade Resistance (%) | Migration Resistance (−) | max Density (−) | $\lambda_{max}$ (nm) | Hue |
|---|---|---|---|---|---|---|
| Ex. 1 | 90 | 100 | 0.03 | 3.20 | 652 | Excellent |
| Ex. 2 | 90 | 98 | 0.01 | 2.53 | 649 | Excellent |
| Ex. 3 | 90 | 100 | 0.03 | 3.20 | 650 | Excellent |
| Ex. 4 | 87 | 100 | 0.02 | 2.30 | 650 | Excellent |
| Ex. 5 | 90 | 100 | 0.01 | 2.30 | 649 | Excellent |
| Ex. 6 | 90 | 100 | 0.04 | 3.20 | 652 | Excellent |
| Ex. 7 | 92 | 100 | 0.03 | 3.20 | 644 | Excellent |
| Ex. 8 | 90 | 100 | 0.04 | 3.20 | 651 | Excellent |
| Ex. 9 | 91 | 100 | 0.04 | 3.20 | 645 | Excellent |
| Comp. Ex. 1 | 90 | 80 | 0.25 | 3.08 | 662 | Excellent |
| Comp. Ex. 2 | 86 | 78 | 0.10 | 2.54 | 667 | Excellent |
| Comp. Ex. 3 | 67 | 96 | 0.08 | 3.20 | 632 | Good |
| Comp. Ex. 4 | 69 | 93 | 0.08 | 3.20 | 632 | Good |

What is claimed is:

1. A cyan dye of the formula:

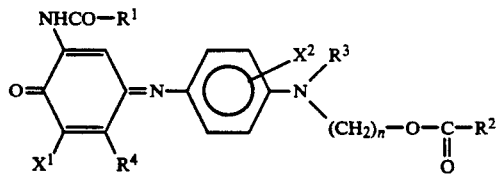

wherein $X^1$ represents chlorine, $X^2$ represents hydrogen, methyl, or perfluoroalkyl; $R^1$ represents methyl, propyl, phenyl, $CF_3$, or perfluoroalkyl; $R^2$ represents methyl, propyl, phenyl, chlorine-substituted phenyl or perfluoroalkyl; $R^3$ represents ethyl; $R^4$ represents ethyl, methyl, or alkoxy; and n is an integer of 1 or more.

2. A cyan dye selected from the group consisting of indoaniline derivatives of the following formulas (1) to (9):

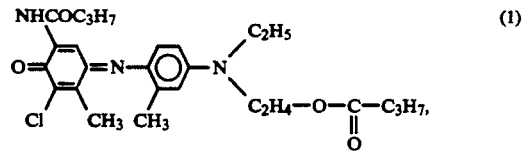

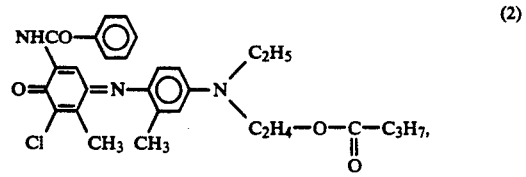

-continued
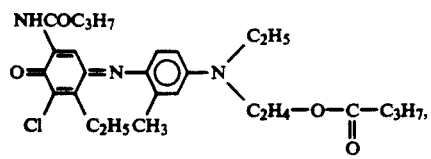 (3)
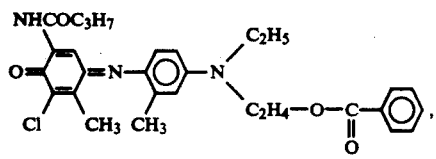 (4)
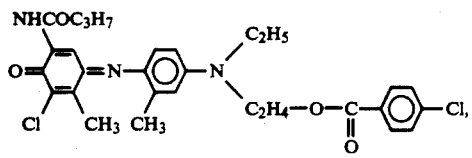 (5)
-continued
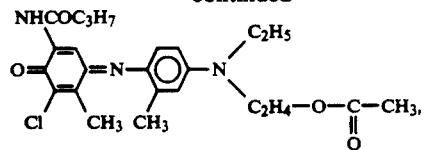 (6)
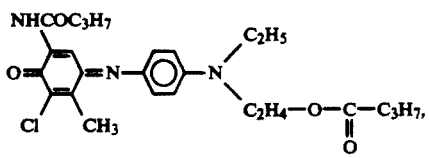 (7)
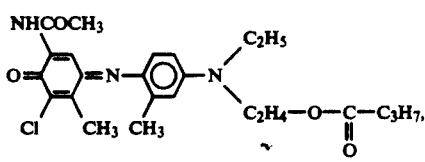 (8)
and
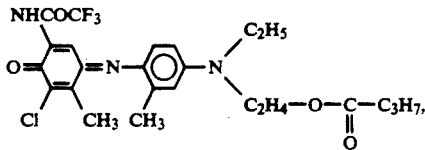 (9)
* * * * *